Oct. 6, 1936.  A. H. MARTY  2,056,339

WALL CONSTRUCTION

Filed June 29, 1935  5 Sheets-Sheet 1

INVENTOR:
ALBERT H. MARTY
BY Herman Eisele
ATTORNEY Oct. 6, 1936.  A. H. MARTY  2,056,359
WALL CONSTRUCTION
Filed June 29, 1935  5 Sheets-Sheet 2

INVENTOR:
ALBERT H. MARTY
Herman Eisele
ATTORNEY

Oct. 6, 1936.  A. H. MARTY  2,056,359
WALL CONSTRUCTION
Filed June 29, 1935  5 Sheets-Sheet 3

INVENTOR:
ALBERT H. MARTY
BY Herman Eiele
ATTORNEY

Patented Oct. 6, 1936

2,056,359

UNITED STATES PATENT OFFICE 2,056,359

WALL CONSTRUCTION

Albert H. Marty, Cleveland Heights, Ohio

Application June 29, 1935, Serial No. 28,988

11 Claims. (Cl. 189—85)

This invention relates generally to wall constructions and specifically to the construction of and mounting for tiles which form the outer wall portion of a building or which form a covering for the outer wall of a building.

More specifically this invention relates to a wall formed of enameled sheet metal tiles or panels associated with new and improved means for mounting such tiles in a removable manner upon a suitable supporting structure.

Although this invention may be incorporated as a part of the wall structure in new buildings, in the specific embodiment disclosed in this application the invention is illustrated and described in its application to an enameled tile facing wall supported upon the outer surface of a building, such a facing wall, for instance, as may be applied to an existing building to render it improved or modernistic in appearance.

One object of this invention therefore, is to produce a tile or panel and mounting for the same which may be economically manufactured and which may be expeditiously and rigidly mounted upon a suitable support.

A further object of this invention is to provide a construction of this type in which the tiles may be readily mounted on those structures in which access is available from the exterior surface of the wall only and in which individual tiles may be mounted in any order desired and in which any individual tile may be removed without disturbing adjacent tiles.

A further object of this invention is to provide a construction of this type which may be readily assembled with the use of simple tools, such as a screw driver, in a minimum of time.

A further object of this invention is to produce a construction of this type which is flexible and readily lends itself to various sizes and arrangements of tiles and which permits the production of any desired artistic or architectural effect.

A further object of this invention is to produce a tile which will be substantial in construction and which will maintain its rigidity during the manufacturing, shipping, and erection processes.

A further object of this invention is to produce a joint between adjacent tiles which will require only a minimum of mastic cement or other cementing material, to seal the grooves or channels between the adjacent tiles.

Another object of this invention is to devise an improved system of and structure for mounting these improved tiles on the face of a wall of an existing building.

Further and more specific objects of this invention will become apparent from the following description and claims. This description sets forth in detail certain constructions and devices embodying this invention, such disclosed constructions and devices constituting but a few forms in which the principle of this invention may be applied.

Referring to the drawings:

Fig. 8 is an enlarged transverse sectional view taken on the plane indicated by line 8, 8 in Fig. 1 showing, however, the parts in a preliminary stage of assembly.

Fig. 9 is a view similar to Fig. 8 showing the parts in a further advanced stage of assembly.

Fig. 10 is another view similar to Fig. 8 showing the parts after the completion of the assembly.

Fig. 12 is an enlarged view taken on the plane indicated by line 12, 12 in Fig. 1.

Figures 13, 14 and 15 are detached front view, side view, and rear view, respectively, of a certain cover bar or filler bar which may be used with this invention.

Fig. 21 is a transverse sectional view similar to Fig. 12 showing a modified form of cover bar or filler bar.

In these specifications the term "front" is used to indicate the outer face or wall of the tile or panel, that is, the face toward the observer, and the term "rear" is used to indicate the inner face or wall of the tile, that is, the face concealed from the observer. It will be understood, however, that this structure can be applied to an inclined wall or to a roof or a ceiling, as well as to a side wall, and that the terms above referred to are intended to include corresponding terms describing corresponding faces of the tiles or panel.

Figure 1:
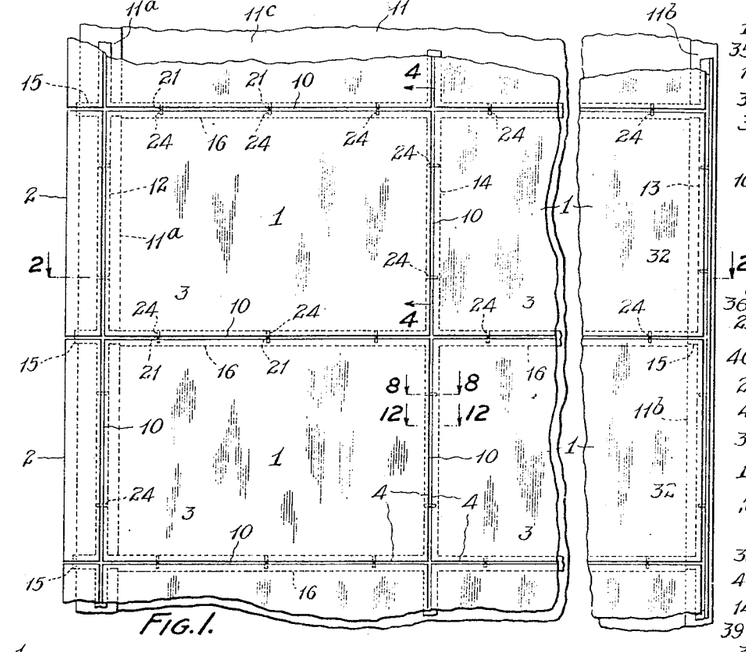
Fig. 1 is a side elevation of a fragmentary portion of a wall constructed in accordance with this invention.
Figure 2:
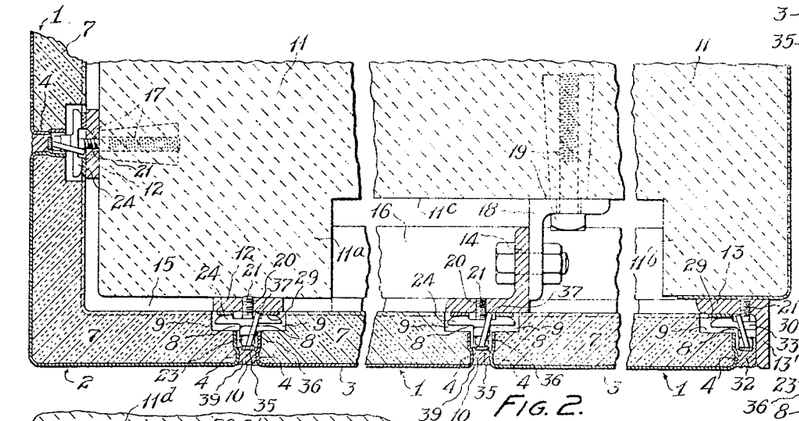
Fig. 2 is an enlarged plan section through the wall shown in Fig. 1 and taken on the plane indicated by line 2, 2, in said figure, this view disclosing also a part of the wall of an existing building and the tile supporting structure, and showing several of the devices used to mount the tiles upon the supporting structure.

Referring first to the construction shown in Figures 1 to 20, the facing wall consists of a plurality of sheet metal tiles or panels indicated generally at 1. These tiles are preferably enameled or colored with other suitable coloring or preservative material. The tiles may be formed in various sizes and contours to suit the requirements of the wall with which they are associated. The tiles 1 are of standard flat rectangular construction adapted to form a flat wall and these tiles may be of any convenient size as will be understood. As illustrations of modified forms of these tiles, Figures 1 and 2 show corner tiles or panels indicated generally at 2 and adapted to form an outside or projecting corner of the wall.

Figures 5, 7, 16, 20:
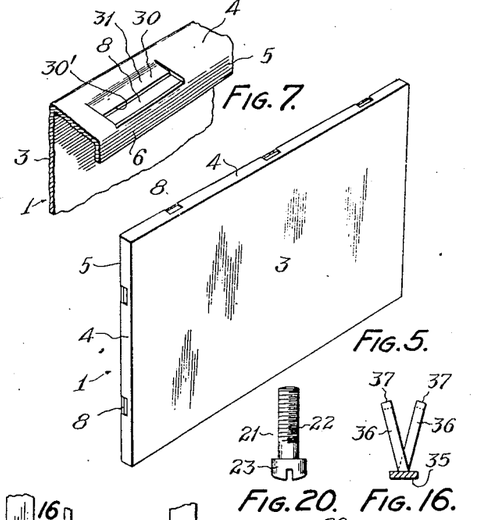
Fig. 5 is a perspective view of one of the tiles shown in Fig. 1 showing the tile as it appears when viewed obliquely from the front.
Fig. 7 is an enlarged fragmentary view of a portion of the tile shown in Fig. 6 showing a recess or slot formed in the side wall of the tile.
Fig. 16 is a transverse sectional view of the cover bar, this view being taken on the plane indicated by line 16, 16 in Fig. 13.
Figure 20 is a screw element forming a part of this invention.
Figures 6, 11:
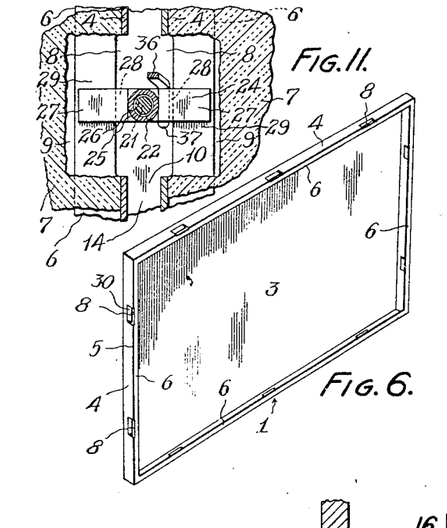
Fig. 6 is likewise a perspective view of a tile shown in Fig. 1, this view showing the tile as it appears when viewed obliquely from the rear.
Fig. 11 is a vertical sectional view of the parts shown in Fig. 10, this view being taken on the plane indicated by the line 11, 11 in Fig. 10.

Each sheet metal tile, as is well illustrated in Figures 5, 6, and 7, consists of front wall or face 3, side walls 4 and rear face 5 which is defined by lips or flanges 6 turned inwardly from the side walls 4 at the rear edge of the side walls into a plane substantially parallel with but spaced from the front wall 3. The depth of the side walls 4 is made of a suitable dimension to impart rigidity to the tile during the manufacturing, shipping, and erection processes.

As will appear from Figures 2, 3, 8, 9, 10, the interior space of the tile of panel 1 is filled with a suitable heat and sound insulating material 7 which may be formed of insulating boards but which is preferably molded in the tiles in liquid form after the tiles have been completed and enameled or otherwise coated. After solidifying, this insulating material is firmly held in place in the tiles by the inwardly turned flanges 6.

A further reference to Figures 5, 6, and 7 will disclose openings 8 formed in the side walls of the tiles 1. As clearly shown in Figures 2, 8, 9, and 10, recesses 9 are formed in the insulating material 7 aligned with the openings 8. The purpose of these openings and recesses will be hereinafter described.

The tiles or panels 1 and 2 as will appear from Figures 1 and 2 are mounted adjacent each other but slightly spaced from each other to form a relatively narrow groove indicated generally at 10. Within this groove are mounted devices which constitute essential features of this invention for mounting the tiles upon a supporting structure and these grooves are subsequently filled with a flexible mastic cement or other suitable material as will be disclosed.

As has been pointed out, these tiles and their supporting structure may be used in various types of structures; however, in the present disclosure, these tiles are shown mounted upon the outer faces of spaced metallic members and these metallic members, in turn, are shown supported by a building wall.

Figure 3:
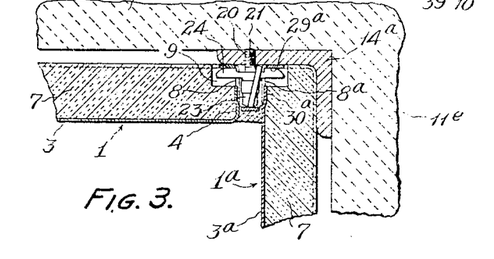
Fig. 3 is a view similar to Fig. 2 showing, however, a wall formed with an inside corner and illustrating the application of the tiles and mounting devices to this form of wall.
Figure 4:
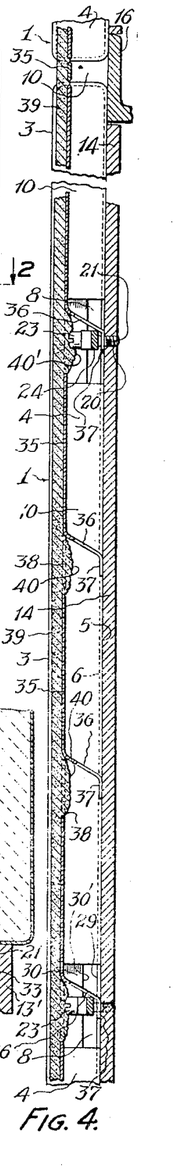
Fig. 4 is an enlarged vertical section taken through the groove or channel between adjacent tiles, this view being taken on the plane indicated by line 4, 4 in Fig. 1 and showing two sets of mounting devices and filler or cover bar which may be used in connection with this invention.

Referring to Figures 1, 2, and 3, a building wall is indicated at 11. This wall, in the illustration, is assumed to be of brick, and in the form illustrated comprises pilasters 11a and 11b and an intermediate recessed panel wall 11c. Supported upon this wall are suitably spaced metallic tile supporting members which, in the illustration, include vertically disposed metal bars 12 and vertically disposed angles 13 and 14. It will be apparent that the bars 12 and one face of the angle 14 are aligned substantially centrally with the grooves 10 and that the faces of these bars and the angle are considerably wider than the width of the groove. Horizontally disposed metal bars 15 and angles 16 as indicated in broken lines in Fig. 1 and in full lines in Fig. 2, are also provided in suitably spaced positions.

The supporting members 12, 13, 14, 15 and 16 may be mounted in any desired manner upon the brick wall 11 either in contact with, or near the wall, and may be secured to the wall by means of flat head anchor screws as suggested at 17 or by means of connecting brackets 18 which are in turn fastened to the wall by anchor bolts 19. It will be understood that the method of mounting the supporting members is immaterial, it being essential, however, that the bars upon which the tiles are mounted be suitably located so that they will be aligned with the grooves 10 between adjacent tiles which the bars are planned to support, and that the tile engaging faces of the bars be substantially flush with each other.

The supporting members 12 to 16 inclusive, are formed at suitably spaced intervals with threaded openings as shown at 20 in Figures 2, 3, 8, 9, and 10. A screw element, consisting in the form illustrated, of a cap or machine screw 21 having a cylindrical body portion 22 and a fillister head or other shoulder means 23 at its outer end, said head being formed with a screw driver slot. As clearly shown in Figures 8, 9, 10, and 11 this screw element 21 is preferably located centrally of the groove 10.

The spacing of the screw elements 21 in the supporting members is preferably substantially the same as the spacings of the openings or recesses 8 in the side walls 4 of the tiles or of adjacent tiles, and in mounting the tiles on the supporting members the recesses 8 in adjacent tiles are located substantially centrally with the screw elements 21. Mounted upon the cylindrical body portion 22 of the screw 21 is a clamping bar or element 24 which is clearly shown in Figures 8, 9, and 10 in place on the screw and which is shown in detached views in Figures 17, 18 and 19.

Figures 17, 18, 19:
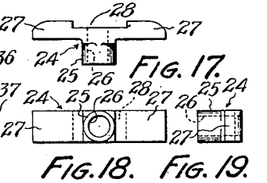
Figures 17, 18, and 19 are plan view, front view, and side view, respectively, of a certain clamp element used as a part of this invention.

This clamping element 24 comprises a preferably cylindrical central hub portion 25 formed with a bore 26 which is of a suitable size to permit its easy rotation upon the body portion 22 of the screw. It will be noted that the outside diameter of the hub portion is slightly greater than the diameter of the head 23 on the screw element 21. This bar additionally comprises a pair of oppositely disposed lateral wings 27 which are preferably rounded at their outer ends as clearly shown in Figures 9, 10, and 17. This bar is further formed with a recess as indicated at 28 provided for a purpose to be hereinafter described, and extending inwardly from the rear face of the bar and extending a considerable distance laterally of the bore in both directions as shown in Fig. 17.

As is best shown in Figures 7 and 8, the opening 8 in the side wall is preferably located adjacent the inner edge of the side wall and is terminated at its inner edge by an outwardly facing shoulder 29. The outer or front edge of the opening 8 is preferably formed by the inner edge 30' of a lip or tongue 30, this lip being substantially parallel to but slightly inwardly spaced from the face of the side wall whereby a shallow recess 31 is formed in the side wall whose bottom is formed by the face of the lip 30 as is well shown in Figures 8, 9, and 10. The ends of the lip are sheared from the adjacent portions of the side walls 4 and the lip is integral with the side wall at its outer end whereby the inner end of the lip is resilient and may be deflected in a direction at right angles to the face of the side wall.

The inner edge 30' of the lip 30 is spaced from the shoulder 29 a distance slightly greater than the thickness of the lateral wings 27 of the clamp bar 24. The opening 8 thus formed between the shoulder 29 and the lip 30 is of a length preferably slightly greater than the overall length of the clamp bar 24 from end to end of wings 27 as clearly appears in Fig. 11. This lip 30 and shallow recess 31 extend for a length coincident with the length of the opening 8. The recess 31 extends outwardly from the edge of the lip 30' for a substantial distance toward the front face of the tile but the outer edge of the recess is spaced from the front face, whereby the edges of the front faces of the tiles form straight lines.

As will appear, a portion of the recess 31 is opposed to the hub portion 25 on the clamp bar and is also opposed to the screw head 23 and in fact extends a substantial distance forwardly of the screw head 23.

The preferred procedure of mounting the tiles upon the supporting structure and securing them in place with the devices described, is as follows and will readily be understood by reference to the Figures 8 and 9. The clamping element 24 is preferably mounted on the cylindrical portion of the screw element 21 and the screw is then partly threaded into the suitably spaced openings 20 in the supporting members, as shown, for instance in Fig. 8. The clamping element 24 may be disposed with its longitudinal axis aligned with the supporting member. A tile is then held against the face of the supporting member with its opening 8 substantially centrally disposed with relation to the screw 21 and clamping element 24. A second tile may then be held against the supporting member adjacent the first tile with its openings 8 juxtaposed to the opening 8 in the previously placed tile and, of course, also aligned with the screw and clamp bar, the tiles being slightly spaced from each other to form a groove of the desired width. The clamp bar is then turned by means of a screw driver or other suitable instrument to a position transversely of the groove so that the wings 27 extend into the openings 8 in the side wall and into the recesses 9 in the insulating material and so that the inner faces of these wings are opposed to the shoulders 29 on the tiles. The clamp bar is then forced toward the supporting member by threading the screw 21 into the threaded opening 20 until the inner surface of the wings 27 of the clamp bar engages the shoulders 29. The screw element is then further tightened until the tiles are firmly held against the supporting member.

As will be understood, it will be possible to assemble the tiles progressively on the supporting members by turning the clamping bar transversely of the groove after the first tile is in place adjacent the clamping bar in which event the opening of the second tile is placed over the outwardly projecting wing of the clamping bar after which the clamping bar may be tightened.

It will be evident from an inspection of Figures 8, 9, and 10 that lateral clearance is allowed between the screw head 23 and the hub portion 25 of the clamp bar 24 and the opposed face of the lip 30. This clearance is provided to permit the expansion and contraction of the tiles and to allow for the variations incident to manufacture and erection of the tiles and of the supporting members. It will also be apparent that the clearance between the screw head 23 and the lip 30 is greater than the clearance between the hub portion 25 and the lip 30, from which it will be evident that a lateral movement of the tile will cause the lip to engage the hub portion 25 before it engages the screw head 23. This feature is of decided importance in the erection process as it is frequently necessary to rest or abut the tile and hence the lip 30, against the clamp bar 24 and/or screw 21 as a stop. In this event the stress is applied to the clamp bar at the inner end of the screw and not to the head on the outer end of the screw, whereby the danger of bending the screw in erection is practically eliminated. It is further to be noted that, with the above arrangement, the screw head does not engage any part of the tile and a rotation of the screw head will consequently not cause the tile to shift or walk during the clamp tightening operation as might occur if the tile contacted the rotating head of a screw. It will further be apparent that, in the event that the flange 30 contacts the hub 25 for any reason, the point of contact being adjacent to the inner or free end 30 of the lip, the lip is relatively easily deflected and the tile is free to expand without damaging any part of the structure.

As will be understood, a sufficient number of these fastening devices including screw elements 21 and clamping bars 24 are applied to the different tiles to hold them securely in place on the supporting members, Fig. 1 indicating a suitable spacing for these clamping bars.

If it should become necessary to shift any tile slightly, it is only necessary to loosen all of the screws 21 surrounding the tile which it is desired to shift. If it should become necessary to remove any tile for purposes of renewal or replacement it is only necessary to turn the clamp bars so that they will be aligned lengthwise with the grooves, whereupon it will be possible to remove the tile and replace it with another similar tile. The facility with which any selected tile may be removed without disturbing the adjacent tiles is one of the important features of this invention. This renewability is particularly essential in the event of accidental damage to one or more tiles either during construction or after erection, in which event a tile may be removed and replaced by a substitute in a remarkably short time and with a minimum of expense for material and labor.

In the construction illustrated in Fig. 3 in which this invention is applied to an "inside" corner' construction at the junction of two right angularly disposed walls 11d and 11e, the opening 8 is provided in the side wall of the tile 1 as usual. The tile 1a shown in this figure, however, is slightly modified by the provision of an opening 8a in the outer face 3a of the tile 1a adjacent one of the end walls of the tile. A shoulder 29a is formed as a part of the side wall of this tile at the point indicated and the slightly offset recess forming flange 30a is formed by shearing and offsetting a tongue shaped portion of the front face toward the rear of the tile. In mounting this tile 1a upon a vertical angle 14a the clamping bar 24 engages the shoulder 29a and thus firmly holds the tile against the supporting angle 14a when the screw 21 is sufficiently tightened.

The fastening means described thus far is especially adapted for fastening two adjacent similar tiles. It frequently occurs in building construction and particularly at the jambs or other edges of walls that a bordering tile must be anchored at its exposed side wall. Such a construction is illustrated at the right end of Fig. 2 and shows the tiles supported upon the inside face of one flange of the angle 13. The other flange 13' of this angle projects toward the front for a distance substantially equal to the thickness of the tiles thereby protecting the edge of the tiles against injury. This arrangement provides a groove 32 between the wall 4 of the tile and the flange 13'. For the purpose of holding the tile in place, a clamp bar 33 is used which may be a standard clamp bar 24 from which one of the wings 27 has been removed. The usual screw 21 is threaded in the supporting bar 13 and serves to firmly hold the tile in position on the clamp bar 13.

After the tiles have been satisfactorily aligned and firmly mounted on the supporting members, the grooves 10 between the adjacent tiles are preferably filled with a suitable material to make the structure air tight and water proof. This material should preferably be of a plastic nature in order to compensate for the variation in expansion and contraction which occurs in building walls of this type and particularly in sheet metal tiles or panels. Mastic cement has been successfully used for this purpose. It has been found, however, that when any considerable depth or thickness of mastic cement is inserted in a groove such for instance as would be required to fill the groove formed in the hereinbefore described construction, that this mastic will flow after a period of time and particularly during warm weather, producing a defective construction and presenting an unsightly appearance both in the vertical and horizontal joints. In order to eliminate this difficulty and in order to reduce the amount of mastic required, I have developed the feature which will now be described.

A relatively slender filler or cover bar 35 of preferably slightly less width than the width of the groove and of a comparatively thin gauge is inserted in the groove after the tiles mounted on each side of the groove have been firmly mounted. As clearly shown in Figures 4, 10, 11, and 13 to 16 inclusive, this bar is formed with a plurality of generally rearwardly extending brackets 36 terminating in tongues 37 which are parallel to but spaced from the bar 35. Slots 38 are formed in the bar 35 adjacent the brackets 36 and generally opposite the tongues 37. As will appear from Figures 13, 15 and 16, the tongues 37 are slightly offset from the center of the bar, and these offsets may be alternately on one side of the bar or on the other. The number of the brackets 36 and tongues 37 is preferably greater than the number of fastening screws and clamp bars and the spacing of the brackets 36 and tongues 37 on the bar 35 is preferably a sub-multiple or aliquot part of the spacing of the screws 21 and clamping bars 24.

In assembling, the cover bars are inserted in the grooves 10 with the tongues preferably located intermediate spaced clamping bars. The cover bar is then moved endwise in the groove until the tongues enter the recesses 28 formed in the central portion of the rear face of the clamp bar. It will be understood that the tongues enter the portion of the recess at the right or at the left of the body portion 22 of the screw 21 depending upon whether the tongue has been deflected laterally to the right or to the left. It will also be apparent from Fig. 4 that a tongue is inserted in the recess behind each clamp bar, and that the additional tongues intermediate the clamping bars engage the supporting member and thus resist any ordinary thrust tending to move the filler bar inwardly. As is clearly shown, the outer body portion of the filler bar engages the heads of the screws 21 and the screw heads are aligned with the slots 38 in the filler bar. It will be apparent that the main body of the filler bar is located outwardly of the screw element and inwardly of the outer edge of the groove.

After this filler bar has been suitably mounted in the groove, the relatively small space between the filler bar and the outer edge of the groove is filled with a suitable mastic cement indicated at 39. This cement adheres to the sides of the groove formed by the outer portion of the side walls of the tiles and by the outer face of the filler bar, and is further anchored in the groove by the small amount of mastic which is wedged in the narrow openings between the edges of the bar 35 and the side walls 4 of the tiles. This mastic cement is not sufficiently fluid to permit any considerable amount to pass through these small openings. The mastic cement, however, does pass through the slots 38 in the cover bar as shown at 40 and the cement thus becomes additionally anchored at these points. It will also be evident that the mastic cement passing through the slots 38 which are aligned with the screws 21, surrounds the screw heads as shown at 40' and serves to firmly lock the screws against rotation and thus prevent the accidental loosening of the tiles on the wall by vibration.

The filler bar is firmly held in the grooves by the tongues 37 and can only be removed by endwise movement of the bar in the groove which is effectively prevented by the mastic cement. Upon the removal of the mastic, however, the filler bar may be readily moved endwise, and removed manually, whereupon the screw 21 becomes accessible for purposes of removing any tile, should this become necessary.

It is also clear that the tongues 37 constitute positive means for preventing the rotation of the clamp bar and thus positively prevent the wings 27 of the clamp bar from rotating out of engagement with the shoulders 29 on the tiles, even if the screw should become slightly loose.

While I prefer to anchor the filler bar in the groove by positive means, such as the tongues 37, particularly in ceiling constructions, these bars may be frictionally or resiliently held in the grooves if desired, for some purposes. The tongues 37, as explained and as shown in Figures 13, 15 and 16 are offset alternately on opposite sides of the filler bar. The tongues are forced laterally by the resilience of the brackets 36 and, as will appear from Fig. 12, nest themselves behind the rounded edges formed at the rear of the side walls 4. The filler bars are thus sprung into position and firmly held against accidental dislodgement but may be readily removed manually. The construction just described makes it unnecessary to insert the tongues behind the clamp bar and all of the tongues may be spaced intermediate the clamp bars and screws.

If a slightly more effective nesting of the tongues behind the rounded edges at the rear of the tiles is desired, the tongues may be twisted in a lateral direction as clearly shown at 41 in Fig. 21 whereby the tips of the tongues nest themselves firmly behind the tiles. In this event, also it is not necessary to align any tongue with a clamp bar.

Other types of filler bars may be advantageously used in association with the tile structure and tile mounting disclosed. I illustrate one modified form of filler bar in Figures 22 to 27 inclusive. In these figures the tiles 1, 1 are identical with those previously described, each tile being formed with the opening or recess 8 in the side wall and with the offset tongue 30 forming the shallow recess 31. The supporting member 14 and the screws 21 having body portion 22 and head 23, are substantially identical with those previously described. The clamp bar 42, best shown in Fig. 23, in this construction, however, is slightly different from the clamp bar 24 previously described. This clamp bar comprises a central hub portion 43 formed with a bore 44 and laterally projecting wings 45. This clamp bar is not formed with a recess corresponding to the recess 28 in the clamp bar 24 as this recess is not required by the modified form of cover bar now to be described.

Figures 22, 23, 24, 25, 26, 27, 28, 29, 30, 42:
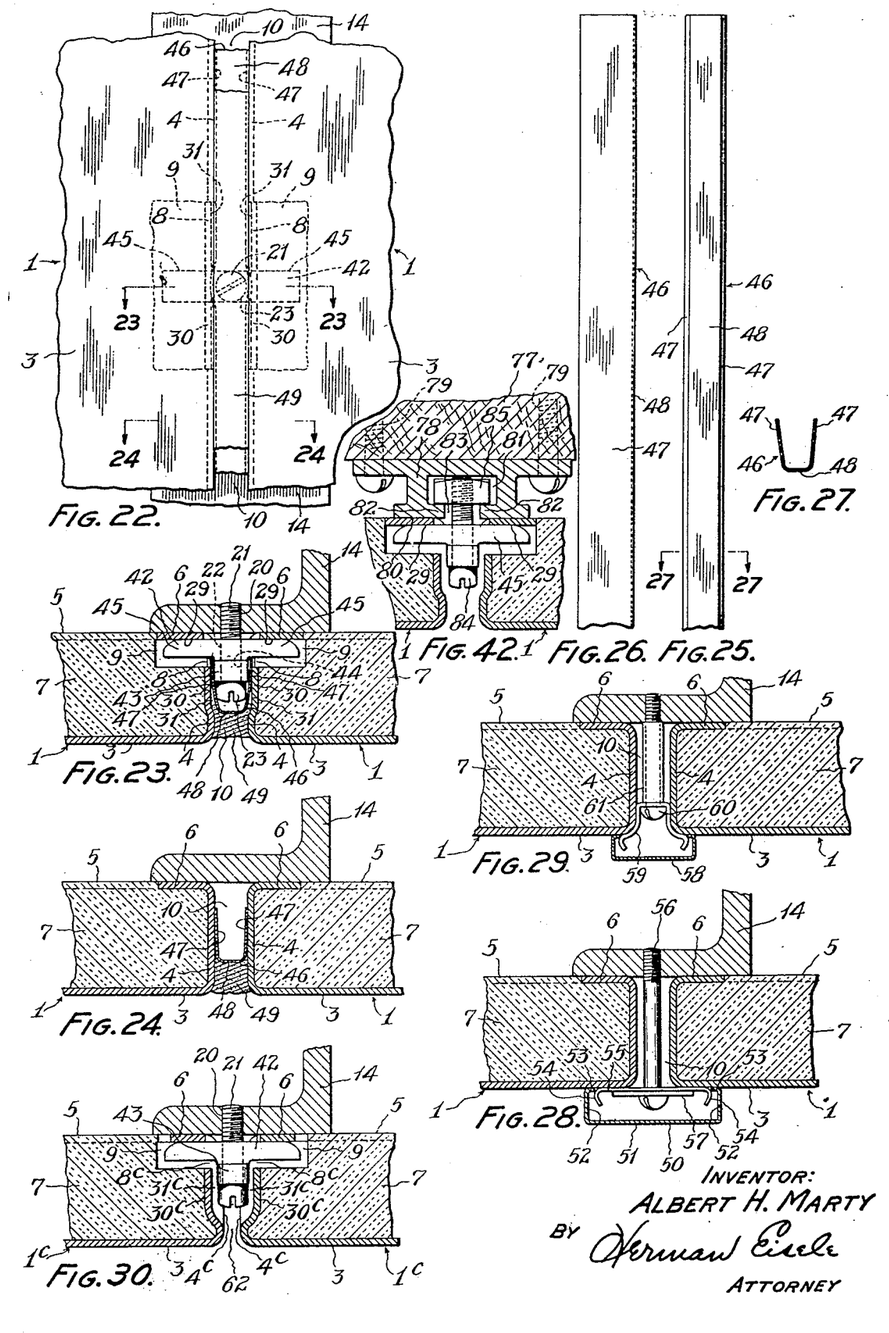
Fig. 22 is a fragmentary front elevational view showing this invention combined with another modified form of cover bar.
Fig. 23 is a sectional view taken on the plane indicated by the line 23, 23 in Fig. 22.
Fig. 24 is a sectional view taken on the plane indicated by the line 24, 24 in Fig. 22.
Figures 25 and 26 are detached front and side views respectively, of the modified form of cover bar used in the construction disclosed in Figures 22 to 24 inclusive.
Fig. 27 is a transverse sectional view taken on the plane indicated by the line 27, 27 of Fig. 25.
Figures 28 and 29 are views similar to Figures 23 and 24, respectively, showing another modification of tile construction and cover bar.
Fig. 30 is a modified adaptation of the tiles similar to those disclosed in the construction illustrated in Figures 22 to 24 inclusive.
Fig. 42 is a view similar to Fig. 9 showing another modification.
Figure 31:
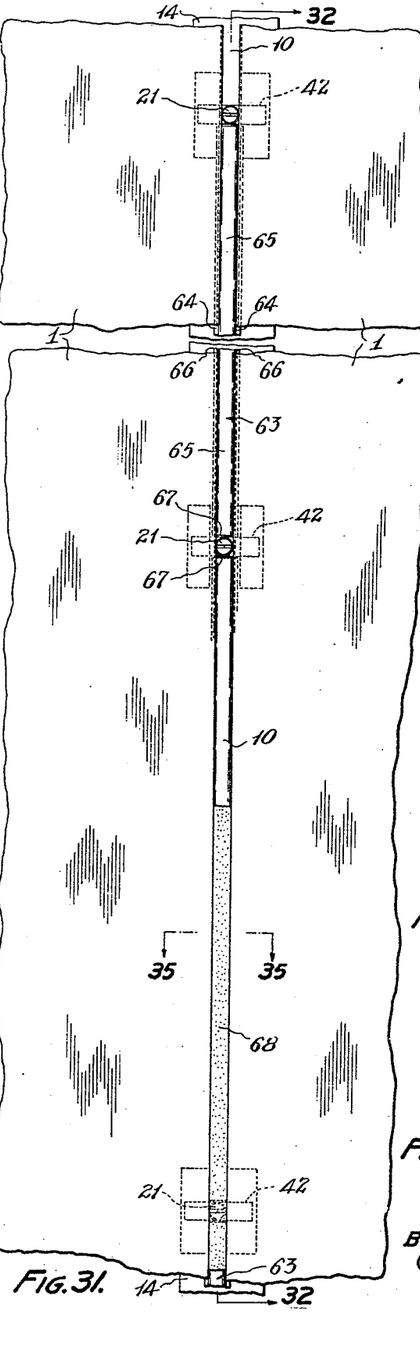
Fig. 31 is an enlarged side elevation of a fragmentary portion of a wall showing a modified form of a tile mounting and filler bar.
Figure 32:
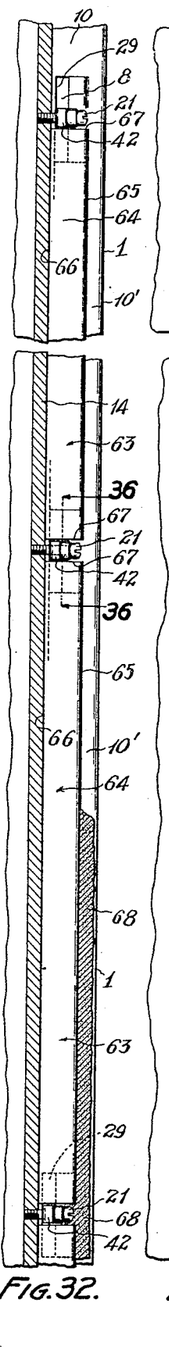
Fig. 32 is a longitudinal section taken on the plane indicated by line 32, 32 in Fig. 31.
Figures 33, 34, 35:
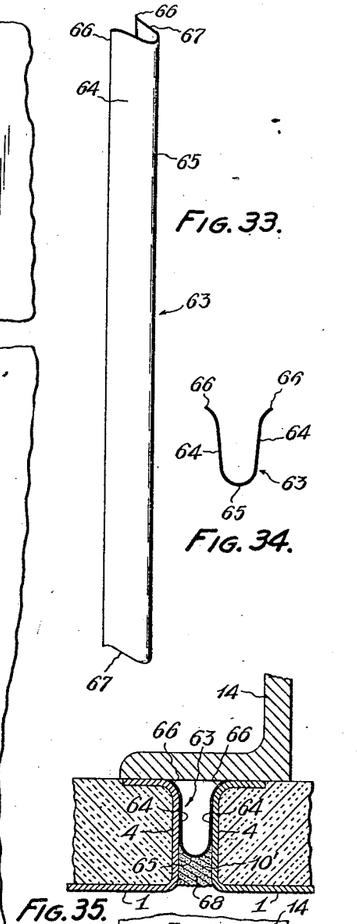
Fig. 33 is a detached perspective view of a filler bar used in the form of the invention shown in Figures 31 and 32.
Fig. 34 is an enlarged transverse sectional view through the filler bar shown in Fig. 33.
Fig. 35 is an enlarged fragmentary section taken on the plane indicated by line 35, 35 in Fig. 31.

This cover bar as is best shown in the detached views, Figures 25 to 27, consists of a generally channel shaped member 46 formed of relatively thin and preferably resilient metallic material and having outwardly inclined flange portions 47, 47 joined by a head or web portion 48. The length of these channel shaped members is preferably not less than the length of the side of a tile and may be of sufficient length to equal the width or length of several tiles.

After the tiles have been satisfactorily located and firmly mounted on the supporting members, the channel 46 is inserted in the groove 10 formed between adjacent tiles by pressing together the outwardly projecting flanges 47. This channel is forced inwardly into the groove until the inner ends of the flanges 47 engage the outer faces of the wings 45. The position of the channel 46 in the major portion of the groove is shown at Fig. 24, from which it will be evident that the outside surfaces of the flanges 47 press tightly against the opposed walls 4 of the tiles 1 and that the channel 46 is thus frictionally held against loosening in the groove. A more effective means for locking the channel is provided at the points where the screw 21 and clamp bar 42 project into the groove. At this point the inner surfaces of the flanges 47 engage the head 23 and are forced outwardly thereby. These flanges are further forced outwardly when they engage the hub portion 43 of the clamp bar and the flanges 47 are deformed by the engagement with the head 23 and hub 43 as shown in Fig. 23 and this deformation serves to bind these flanges to effectively hold the channel within the groove. It will also be clear that the binding action of the channel upon the two sides of the head of the screw will effectually prevent the rotation or loosening of this screw.

For many installations the groove filled by this channel is considered to present a sufficiently finished appearance and no additional filler is required in the groove. This is especially true for those installations in which these tiles are used for the resurfacing of an existing building or for a ceiling, in which this tile structure need not be weather-proofed. If it is desired to have the head or web of the channel flush with the outer surface of the tiles it is only necessary to increase the length of the flanges 47 to the desired extent as will readily be understood.

If it is desired to waterproof the groove a mastic cement as clearly shown at 49 may be introduced into the outer portion of the groove as clearly shown in Figures 22, 23, and 24. This mastic cement will be forced into the wedge shaped opening between the walls 4 of the tiles and the flanges 47 of the channel and will adhere to the channel and tiles thereby becoming securely anchored in place and serving as an additional means to maintain the channel 46 in position.

In Figures 28 and 29 a somewhat different method of treating the groove 10 is disclosed. This modification discloses means which serve the dual purpose of concealing the groove 10 and forming a finishing bead to produce any desired artistic effect. In this modification it will be understood that the method of mounting the tiles 1 on the supporting members 14 may be substantially identical with the mounting means shown, for instance, in Figures 22 and 23.

Referring to Fig. 28, a bead forming member 50 of substantially channel shaped cross section is shown and comprises a web portion 51, flange portions 52 and inwardly directed continuous lips 53 formed at the inner edges of the flanges. The flanges 52 are sufficiently resilient to permit the lips 53 to slide over the inclined outer ends 54 of spaced brackets 55, only one of which is shown.

The brackets 55 are held in place by spaced screws 56 which engage correspondingly spaced tapped holes in the supporting member 14. In order that the bracket 55 may be firmly frictionally held in place against the face of the tile 1, a washer 57 of suitable thickness and of a size sufficient to overlap portions of the spaced tiles is interposed between the head of the screw 56 and the bracket 55 whereby the bracket may be firmly pressed against the faces of the adjacent tiles without substantial distortion. The bead 50 is resiliently held in place by the projecting ends 54 of the spaced brackets 55 and may be removed by inserting a suitable tool between the lips 53 and the face of the tile 1, as will be understood. It will also be evident that the bead 50 may be of a metal which is different in appearance from that of the tiles 1 or the bead may be of a metal coated with enamel of any suitable color to produce the desired color effect.

Fig. 29 illustrates another modification similar to that shown in Fig. 28. In this illustration, however, the bead 58 is of smaller width than the bead 50 and in this construction the comparatively wide bracket 55 and washer 57 would not be feasible. For this reason an alternative construction for holding the bead is disclosed in Fig. 29 which shows one of a series of spaced brackets 59 secured to the supporting members 14 by means of a screw 60. In order that the bracket 59 may be located in proper spaced relation to the supporting member 14, a spacer shown at 61 may be interposed between the head of the screw 60 and the supporting member 14. By this means a correct snap on action and holding tension may be effected to satisfactorily and removably hold the bead 58 in place. It will be evident that the beads are not limited to the channel shaped cross section shown but may have any desired form.

For some purposes a wide groove between tiles is objectionable and I have illustrated in Fig. 30 a slightly modified form of tile construction showing how a considerably narrower groove may be produced. In this modified construction, the tiles 1c, 1c, are formed with the usual opening 8c. In place of the lip 30 however, a lip 30c is provided which is offset for a considerably greater distance from the face of the wall 4c of the tile thus forming a deeper recess 31c. This makes it possible, as will be evident, to move the faces 4c, 4c of the tiles closer together before the tongues 30c engage the hub portion 43 on the clamp bar 42. The relatively narrow groove 62 thus formed may be made as narrow as desired but should preferably be left sufficiently wide to permit the entrance of a screw driver of suitable strength to tighten the screw. Oakum or other suitable material may be placed into these relatively narrow grooves and the outer portion of the groove may then be filled with a thin layer of mastic as will be understood.

Figures 31 to 36 inclusive, illustrate a form of this invention in which a modified type of filler bar is used for partly filling the groove formed between adjacent tiles. In these figures, 14 indicates a supporting member upon which the tiles 1 are mounted by means of screws 21 and clamp bars 42 which project into the openings 8 and engage the shoulders 29 on the tiles 1, as has been hereinbefore explained. After the tiles have been securely mounted in place, a filler bar 63 of suitable length is inserted in the groove 10 between the adjacent tiles. This filler bar, as clearly appears in Fig. 34, consists of a generally channel shaped member formed of relatively thin and preferably resilient material and is formed with diverging flange portions 64 joined by a head or web portion 65. The head portion 65 is preferably rounded as shown and is preferably slightly less in width than the usual width of the groove 10. The flanges 64 are formed with outwardly curved terminals 66. The length of the bar 63 is slightly less than the space between the two clamp bars 42 between which the filler bar is to be placed. In practice, as will be understood, the center to center location of the clamp bars is selected of a certain standard repetitive dimension and the filler bars 63 may then be cut in quantities to suitable corresponding lengths.

As will appear, the space between the terminals 66 of the filler bar is normally considerably greater than the width of the groove 10. In inserting the filler bar in the groove the terminals 66 are pressed together and after the bar has been forced to the bottom of the groove, the resilience of the metal will force the terminals outwardly so that these terminals are resiliently held in engagement with the outwardly diverging rounded edges formed at the rear of the side walls 4 as clearly shown in Fig. 35.

Figure 36:
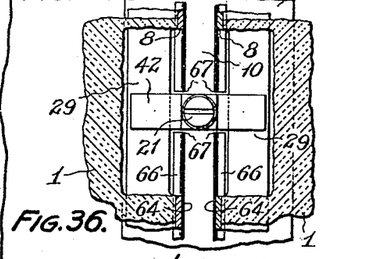
Fig. 36 is an enlarged sectional view taken on the plane indicated by line 36, 36 in Fig. 32.

It will be apparent particularly from Fig. 36 that the ends 67 of these filler bars serve to prevent the rotation, accidental or otherwise, of the clamp bars 42 and it will also be apparent that the filler bars cannot ordinarily be inserted in the grooves 10 unless the clamp bar is turned to its proper crosswise position.

The depth of the filler bar 63 from the head 65 to the terminals 66 is preferably substantially less than the corresponding depth of the tiles so that a portion of the groove 10 as shown at 10' remains unfilled after the filler bar has been put in place. This portion 10' may be filled with mastic cement or other suitable waterproofing or weatherproofing cement as shown at 68. This cement will partially fill the slightly open wedge shaped spaces between the flanges 64 of the filler bar and the walls 4 of the tiles. It will also be apparent inasmuch as there is no cover bar above the screw 21, that the mastic cement 68 will be forced upon and downwardly around this screw 21 and the clamp bar 42 thus effectively preventing these members from rotating.

It will also be apparent that the filler bar 63 may be readily withdrawn after the removal of the mastic cement by inserting a screw driver or other suitable pointed tool in the open end of the bar.

Figures 37, 39, 40, 41:
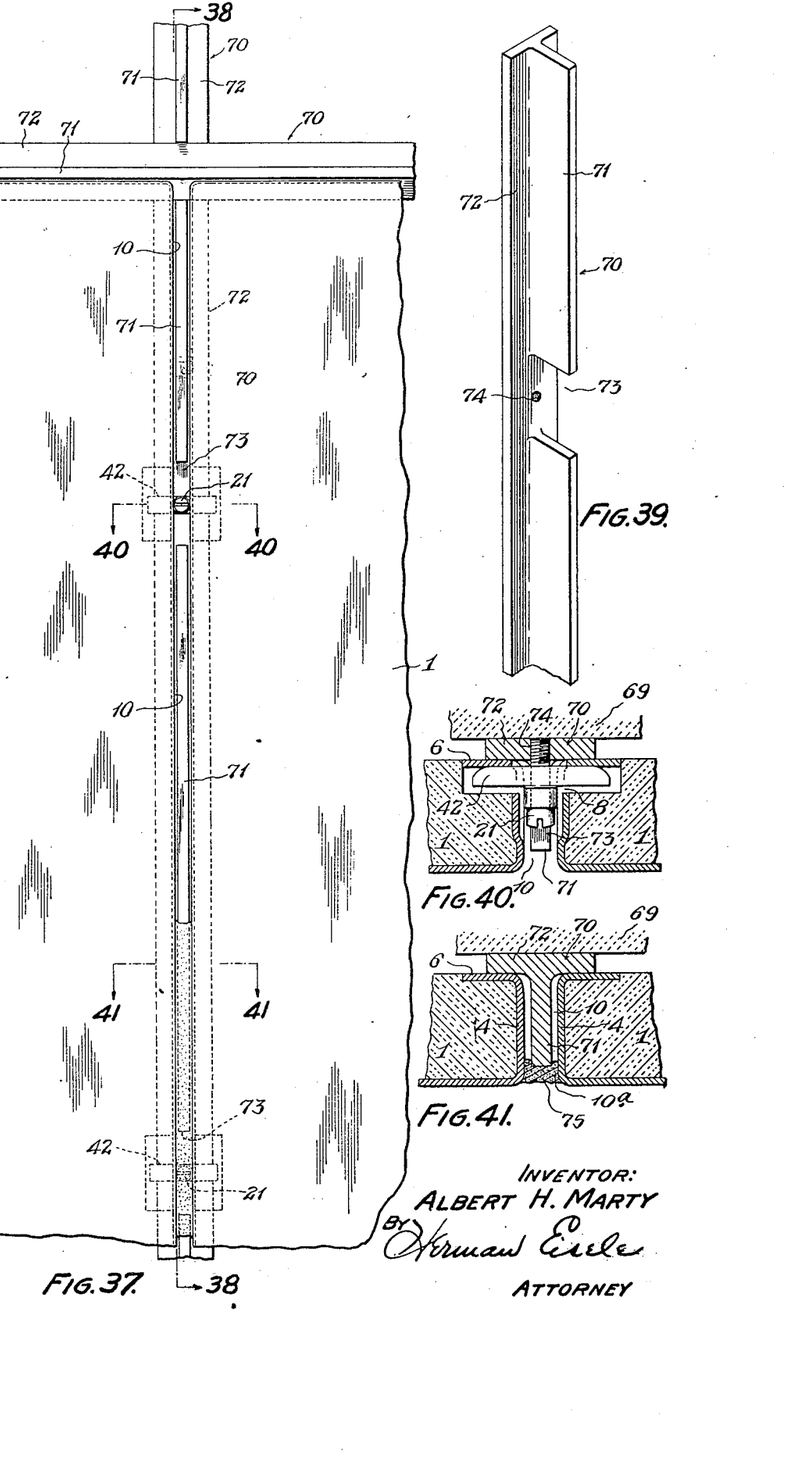
Fig. 37 is another enlarged fragmentary side elevation of a portion of a wall showing the use of a modified form of supporting member.
Fig. 39 is a detached view of a portion of one of the supporting members employed in the construction illustrated in Figures 37 and 38.
Fig. 40 is an enlarged transverse sectional view taken on the plane indicated by the line 40, 40 in Fig. 37.
Fig. 41 is an enlarged transverse sectional view taken on the plane indicated by line 41, 41 in Fig. 37.
Figure 38:
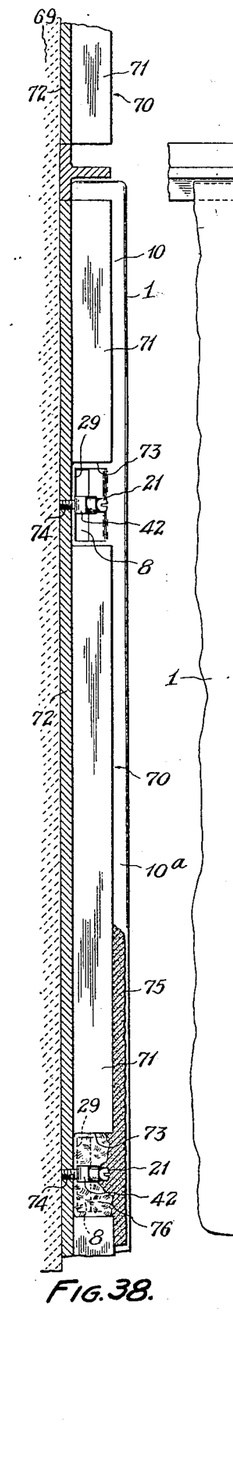
Fig. 38 is a longitudinal section taken on the plane indicated by line 38, 38 in Fig. 37.

In Figures 37 to 41 inclusive is illustrated a modified form of supporting frame which simultaneously serves as a support for the tiles and also performs the function of the filler bar intermediate the clamp bars. This improved supporting member consists of a T 70 of suitable weight and cross sectional dimensions, formed with a stem 71 and a base 72. A plurality of these T's may be mounted on the wall 69 in proper spaced relation in any suitable manner, and may be arranged horizontally and vertically as will be understood and as is suggested in the upper portion of Fig. 37. Where the ends of T's abut continuous T's, suitable aligning devices may be provided if desired or the T's may be suitably welded to each other at these points. The stem 71 of the T's as is shown in Figures 37, 38, and 39 is cut away at suitable intervals as shown at 73 to form spaced openings in said flange, the spacing corresponding to the spacing of the openings 8 in the tiles 1, at which it is desired to apply the tile fastening means.

Substantially centrally of the cut away portions a threaded opening 74 is formed in the base of the T adapted to receive the screw 21. The screw 21 by means of the clamp bar 42 which engages the shoulder 29, firmly secures the tiles 1 in position on the supporting T's 70.

It will be understood that the length of the cut away portion 73 is preferably sufficient to permit the clamp bar 42 to be seated longitudinally in this cut away portion to facilitate assembling and replacement of tiles.

The upwardly projecting stem portion 71 projects into and partially fills the grooves 10 between the several sets of fastening means for mounting the tiles. As will be apparent from Figures 38, 40, and 41, the height of the stem 71 above the base 72 and the thickness of the tiles 1 are so selected that a portion 10a of the groove 10 remains open. This unfilled portion of the groove may be filled with mastic cement as shown at 75 or other suitable waterproofing material. The space between the screw 21 and clamp 42 and the ends of the stem 71 at the cut out portion of said stem may be filled with mastic cement, or, if desired, oakum may be inserted between the fastening means and the end of the stem as clearly shown at 76, Fig. 38, in order to reduce the amount of mastic cement required at these points.

Fig. 42 illustrates another modification of this invention which is especially well adapted for mounting this invention upon wood walls. This modification also discloses a structure which makes it unnecessary to accurately space tapped openings in the supporting member.

In this view a wood wall is shown at 77 upon which is mounted a supporting member 78 which may be secured to the wall by means of wood screws 79, nails or any other suitable securing means. The supporting member 78 is formed with a front face 80 upon which the rear faces of the tiles 1 are seated. The member 78 is further formed with a groove 81 and with lips 82 partly closing this groove and leaving an intermediate opening 83. The usual clamp bar 45 engages the shoulders 29 of the tiles and this clamp bar is in turn adapted to be forced against the shoulders 29 by means of a screw element 84 engaging a nut 85 located within the groove 81. The nut is preferably square and of a width and height slightly less than the width and depth of the groove so that the nut may be freely moved longitudinally of the groove.

It will be apparent that this construction eliminates the necessity for drilling and accurately locating tapped openings in the supporting member. It will also be understood that this construction facilitates the assembling of the tiles upon the supporting member for the reason that the erector is not confined to any fixed location of his screw elements and he therefore has greater freedom to enable him to locate the tiles to suit the requirements of the joints between the tiles without reference to any tapped holes in the supporting member. It will also be evident that the ends of contiguous alined supporting members need not be accurately located one with relation to the other on the building due to the fact that the screw element can be mounted anywhere along the length of the supporting member.

While this invention is described as a facing construction for a wall constructed of brick, wood or other material, and has been used extensively for the purpose of covering old and unsightly walls, the facing tiles and mounting described may be used as an independent wall structure in which case the supporting members will be somewhat heavier than those shown and will be well supported at suitable points. In this case the insulating material enclosed in the tiles will efficiently prevent the transmission of heat or cold. Such independent walls constructed as outlined make economical and artistic walls.

Although the screw element for clamping tiles against the supporting member is shown as a slotted head or cap or machine screw, any other suitable tightening means may be substituted, as for instance, a bolt, or a stud and nut combination, or a drive screw, or any other suitable means which can be actuated from the face of the wall.

Although illustrated as applied to side wall constructions, this invention may be equally well applied to ceilings, roofs, or walls disposed at other angles.

It will also be understood that the insulating material within the tile is optional and may be dispensed with, and that the tiles may be made of other material than sheet metal.

The openings 8 in the side wall and the shoulders 29 need not necessarily be located adjacent the rear faces as they may equally effectively be placed in the center or near the front edge of the side walls. If desired, it will be understood that the clamp bar may be turned end for end with the wings at the front and the hub portion at the rear.

It will also be understood that, for some purposes, the hub member may be omitted from the clamp bar and that a simple straight bar may be used in place of the bar disclosed.

Many other modifications will naturally occur to those skilled in this art and these present disclosures should therefore be considered as typical only and I desire not to be limited to the exact construction shown and described and I intend to include as a part of this invention all such obvious modifications of parts as would fall within the scope of the appended claims.

What I claim is:

1. A wall structure including a building wall comprising pilasters and recessed walls intermediate said pilasters, metallic bars fixedly mounted on the pilasters and metallic bars supported in spaced relation from the recessed walls between said pilasters, said bars forming rectangular open panels, the outer faces of said bars being substantially in the same plane, a plurality of tiles disposed on said bars, each of said tiles being substantially co-extensive with one of said panels, said tiles having front faces and side walls, recesses formed in said side walls, spaced screw means mounted in said bars, and means associated with said recesses and engaged by said screw means adapted to hold said tiles firmly in position against the faces of said bars.

2. A wall structure including a supporting member, a plurality of facing tiles having front and side walls, adjacent tiles being spaced from each other to form an intervening groove, opposed side walls of said spaced tiles being formed with recesses terminating in fixed shoulders at their inner ends and laterally resilient shoulders at their outer ends, a clamp element adapted to engage said fixed shoulders, and screw means mounted in the supporting member for forcing said clamp element against said fixed shoulders, said clamp element having a portion projecting outwardly beyond the inner end of said resilient shoulders, whereby said resilient shoulders are adapted to engage said outwardly projecting portion when said tiles expand.

3. A wall structure including a supporting member, a plurality of facing tiles having front and side walls, adjacent tiles being spaced from each other to form an intervening groove between said side walls, juxtaposed shoulders provided in said adjacent side walls, a transversely disposed clamp bar engaging said shoulders, means for forcing said clamp bar toward said support, said clamp bar being spaced from said supporting member, an elongated cover bar mounted in said groove outwardly of said forcing means, means associated with said cover bar inserted between said clamp bar and said supporting member, adapted to support said cover bar in said groove in spaced relation from said supporting member.

4. A wall structure including a supporting member, a plurality of facing tiles having front and side walls, adjacent tiles being spaced from each other to form an intervening groove, means for fastening said tiles to said support, an elongated cover bar mounted in said grooves, means provided on said cover bar cooperating with said fastening means, for holding said cover bar in spaced relation with said supporting member, and additional means intermediate said fastening means for holding the intermediate portion of the cover bar in spaced relation from said supporting member.

5. A wall structure including a supporting member, a plurality of facing tiles having front and side walls, adjacent tiles being spaced from each other to form an intervening groove, means disposed in said grooves for fastening said tiles to said support, an elongated cover bar mounted in said groove outwardly of said fastening means but inwardly of the outer edge of said groove, the width of said cover bar being substantially equal to the width of the groove, means for holding said bar in spaced relation with said supporting member, and plastic cement inserted in the groove outwardly of the cover bar.

6. A wall structure including a supporting member, a plurality of facing tiles, having front and side walls, adjacent tiles being spaced from each other to form an intervening groove, means, including a screw element, disposed in said groove for fastening said tiles to said support, an elongated cover bar mounted in said groove outwardly of said screw element, but inwardly of the outer edge of the groove, means for holding said cover bar in spaced relation with said supporting member and in fixed relation with said screw element, said bar being formed with an opening registering with said screw element, and plastic cement imbedded in said opening and adjacent said screw element, said imbedded cement tending to prevent the rotation of the screw element.

7. An elongated cover bar for use in tile mountings of the class described formed with a plurality of spaced slots and provided with a plurality of spaced relatively long narrow tongues adjacent said slots and extending rearwardly and laterally from said bar, the outer ends of said tongues being bent in a direction substantially parallel with the body of the bar.

8. A wall structure including a supporting member, a plurality of facing tiles having front, side, and rear walls, adjacent tiles being spaced from each other to form intervening grooves, means disposed within said grooves for mounting the tiles on said supporting member, a generally channel shaped cover bar inserted in said groove, said bar being provided with a web portion of substantially the same width as the groove and with resilient flange portions normally wider than the groove, said web portion being spaced from the outer end of said groove, and waterproofing cement inserted in said groove exteriorly of said web portion.

9. A wall structure including a supporting member, a plurality of facing tiles disposed on said supporting member and having front, side, and rear walls, adjacent tiles being spaced from each other to form intervening grooves, the junction of the side and rear walls formed with rounded corners forming lateral recesses at the bottoms of the grooves, spaced means disposed within said grooves for mounting the tiles on said supporting member, filler members of generally channel shaped cross section inserted in said grooves between said mounting means, said filler members being formed of resilient material and including resilient flange portions normally wider than the grooves, said flange portions formed with outwardly projecting lips at their terminals resiliently engaging said lateral recesses.

10. A wall structure including a supporting member, a plurality of facing tiles having front, side, and rear walls, said tiles being disposed adjacent each other upon said supporting member in slightly spaced relation to form intervening grooves, spaced means disposed within said grooves for fastening the tiles to said supporting member, channel shaped filler members comprising flange and head portions disposed in said grooves between said spaced fastening means, the depth of said channel shaped members being less than the depth of the grooves, the flange portions engaging the supporting member, and plastic cement inserted in said groove exteriorly of said channel and exteriorly of said fastening means.

11. A wall structure including a supporting member, having an integral forwardly directed flange, a pair of facing tiles having front, side, and rear walls disposed on said supporting member with said side walls adjacent to but slightly spaced from opposite sides of said flange, spaced openings formed in said flange, recesses formed in said side walls aligned with said spaced openings, and fastening means disposed in said openings and engaging said recesses adapted to firmly hold said tiles in position on said supporting member.

ALBERT H. MARTY.